UNITED STATES PATENT OFFICE.

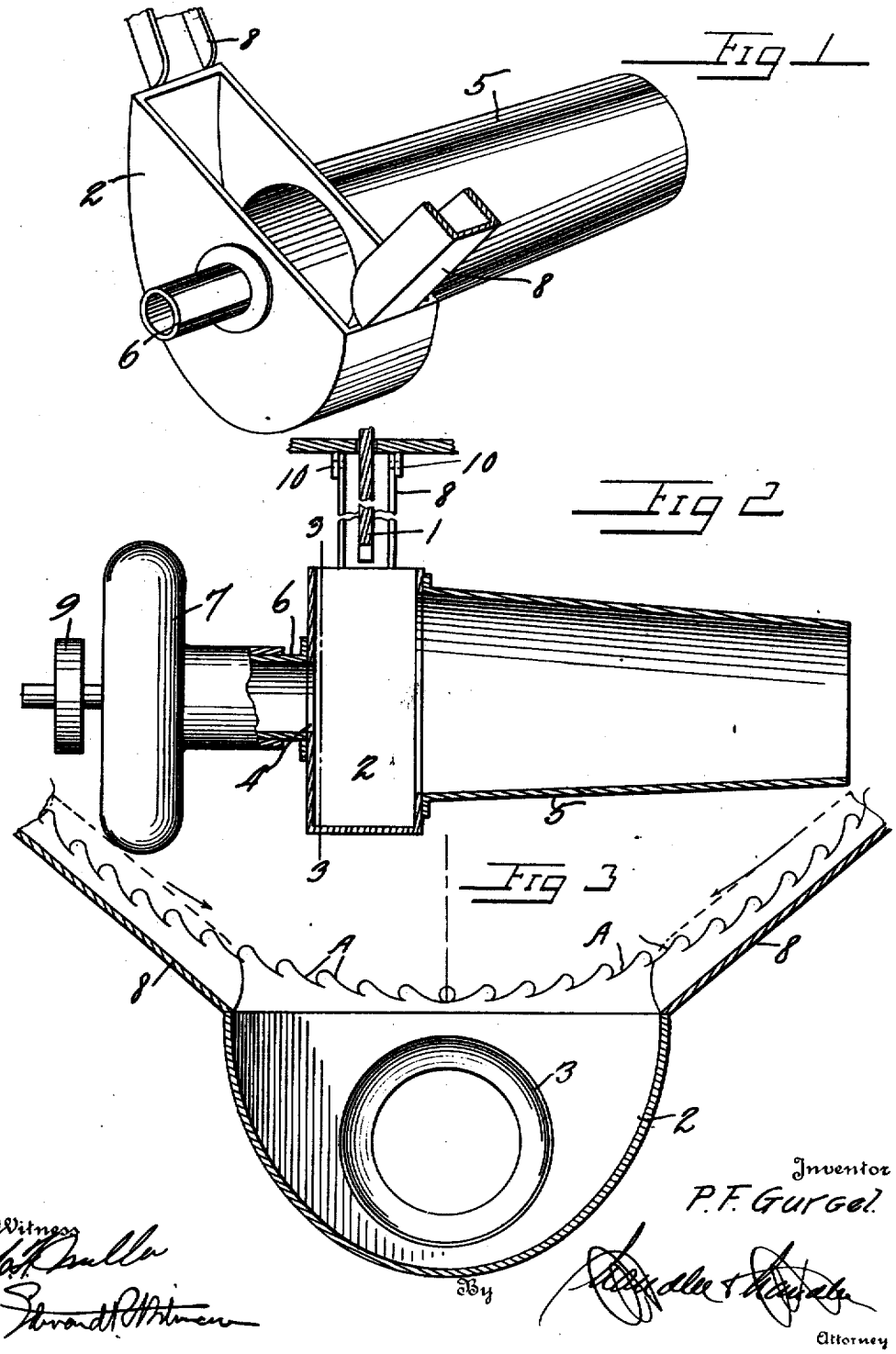

PAUL F. GURGEL, OF NEILLSVILLE, WISCONSIN.

SAWDUST-CONVEYING ATTACHMENT.

1,321,031. Specification of Letters Patent. Patented Nov. 4, 1919.

Application filed July 19, 1916. Serial No. 110,223.

*To all whom it may concern:*

Be it known that I, PAUL F. GURGEL, a citizen of the United States, residing at Neillsville, in the county of Clark, State of Wisconsin, have invented certain new and useful Improvements in Sawdust-Conveying Attachments; and I do hereby declare the following to be a full, clear, and exact description of the invention, such as will enable others skilled in the art to which it appertains to make and use the same.

This invention relates to sawdust conveying apparatus for saw mills, and has particular reference to a pneumatic attachment in the class specified.

The primary object of the invention is to provide an improved conveying apparatus which may be attached to any saw mill, particularly portable mills, for removing the sawdust as it flies from the circular saw.

My improvement consists essentially of a hopper or trough into which the sawdust is thrown as it escapes from the saw and is blown into a conveyer conduit through which it is conducted to the sawdust pile. By this construction, it is seldom necessary to dig a sawdust pit below the machine for catching the sawdust, the sawdust being instantaneously disposed of with each cut which the machine makes.

A further object of the invention is to construct a sawdust conveyer for saw mills which pneumatically removes the sawdust from the saw blade, but which does not pass the sawdust through a fan, as in those devices heretofore known to me, so that the fan blades are in danger of becoming clogged from sawdust or bent and broken by means of knots or pieces of bark. By reason of the fact that the sawdust does not pass through the fan, the latter is permitted to run at full speed at all times, instead of being greatly reduced in speed during the cutting of a board as is the case where the sawdust must pass through the fan. As a result, the sawdust does not have a chance to clog the fan, and the sawdust from the cut is entirely cleaned out of the conduit by the time the carriage can be "jigged back."

With the above and other objects in view, as will hereinafter appear, my invention will be fully set forth and described, reference being had to the accompanying drawings.

In said drawings:

Figure 1 is a perspective view of the saw receiving trough, showing the relation of the blast opening and the sawdust receiving conduit, Fig. 2 is a longitudinal section showing the relationship of the apparatus to a circular saw, Fig. 3 is a section on the line 3—3 of Fig. 2 looking in the direction of the arrow, the saw being divided on its vertical diameter to indicate either a right or left hand cutting edge.

Referring more particularly to the drawings, 1 represents a circular saw of the usual type, whose lower edge is positioned just above the mouth of the trough or hopper 2. The hopper 2 may be of any suitable conformation, but preferably assumes the shape of an end of an ellipse, so that sawdust which is thrown into the rounded bottom of the trough will be induced to fly upwardly again so as to be brought into the sphere of action of the air blast. In mounting the trough or hopper below the saw blade 1, the edge of the saw is brought into position just above the upper edge of a comparatively large circular opening 3 formed in one face of the hopper, so that sawdust which flies from the teeth A of the blade 1 will be thrown across the opening 3, in position to be intercepted by a blast of air issuing through the opening 4 formed in the opposite face of the trough 2 and in substantial registration with the opening 3. The opening 3 constitutes an outlet into a conduit section 5, which is frusto-conical in shape, the larger end of the conduit being secured in any suitable manner around the opening 3. The shape of the conduit 5 provides a contraction in the passage through which the sawdust must go, so that the air column is slightly compressed therein and properly carries the sawdust to the sawdust pile. The opening 4 is provided with an external collar or sleeve 6 which provides a fitting for the connection of the blower fan 7. The fan 7 may be of any suitable type, which will throw a whirling column of air across the trough 2 and into the conduit 5.

The trough 2 coacts at one or both sides with the extension chute 8 which catches the sawdust and directs it to the bottom of the trough, or into the path of the blast from the blower 7. Thus substantially the whole peripheral portion of the saw which carries and throws sawdust is brought within the limits of the sawdust conveying devices, so that in practice, substantially all of the sawdust is carried away from the machine, and no pit is required to catch the sawdust below the saw hanger. Ordinarily, only one of the chutes 8 is utilized, namely that one which underhangs the cutting side of the saw. Thus, as indicated in Fig. 3, the right hand side of the figure shows a left hand mill equipment, with the teeth *a* operating downwardly as shown by the arrow, while the opposite half of the figure shows the reverse arrangement. The upper end of the chute 8 is suspended from the side of the husk or saw frame, as at 10, and its lower end rests freely on the edge of the trough 2. While it is not usually necessary to use two of the chutes, one on each side, obviously two may be readily suspended, and since the chutes are removably hung, a single chute may be readily shifted from one side to the other when the cutting direction of the saw is changed.

In the operation of my apparatus the latter is first installed by supporting the trough in any suitable manner below the saw 1 in such position that the lower edge of the saw appears on a line just above the upper edge of the opening 3. A conduit or pipe of suitable material is attached to the conduit section 5 and leads to the sawdust pile at any suitable point. The blower 7 may be mounted upon the saw hanger or upon a separate stand, as suits the convenience or desires of the mill operator, and is driven by means of the pulley 9, which is belted to the main drive shaft of the saw mill or other power plant. When the fan is operated, a column of air is blown from the opening 4 across the trough 2 and into the conduit 5. When the saw passes through a timber the sawdust is thrown from the lower portion of the saw across the opening 3 and is caught by the blast of the opening 4 and carried through the conduit 5. The contraction of the conduit section 5 causes the column of air and the load of sawdust carried thereby to be carried in compact, slightly compressed relation through the extended conduit, so that the whole load of material is entirely cleared away from the machine and thrown upon the pile before another cut can be made.

What I claim as my invention is:—

A sawdust conveyer for circular saws comprising a trough adapted to be positioned below the saw and including flat side walls parallel with the plane of said saw, a sawdust exhaust conduit communicating with the trough through an opening in one of its side walls, an air blast conduit communicating with the trough through an opening in the other side wall smaller than and in axial alinement with said exhaust opening whereby a column of air is directed across the trough wholly beneath the saw, and a chute underlying the working side of the saw with its bottom directed over one end of the trough on a line to intersect said column of air.

In testimony whereof, I affix my signature, in the presence of two witnesses.

PAUL F. GURGEL.

Witnesses:
CHAS. L. AAPLIN,
JULIA KEITH.